United States Patent [19]

Mareau

[11] Patent Number: 4,505,382
[45] Date of Patent: Mar. 19, 1985

[54] BELT CONVEYOR

[75] Inventor: Dominique Mareau, Saint Martin D'Heres, France

[73] Assignee: Gimar S.A., Eybens, France

[21] Appl. No.: 457,343

[22] Filed: Jan. 12, 1983

[30] Foreign Application Priority Data

Jan. 19, 1982 [FR] France .............................. 82 00942

[51] Int. Cl.³ .............................................. B65G 15/08
[52] U.S. Cl. ................................................... 198/819
[58] Field of Search ........................ 198/819, 818, 833

[56] References Cited

U.S. PATENT DOCUMENTS

| | | | |
|---|---|---|---|
| 2,751,065 | 6/1956 | Thompson | 198/818 |
| 2,845,166 | 7/1958 | Schaeffer | 198/819 |
| 2,925,903 | 2/1960 | Robbins | |
| 2,928,525 | 3/1960 | Schaeffer | 198/819 |
| 3,326,354 | 6/1967 | Aydelott | |

FOREIGN PATENT DOCUMENTS 1351132  4/1974  United Kingdom ................ 198/819

*Primary Examiner*—Joseph E. Valenza
*Assistant Examiner*—Kyle E. Shane
*Attorney, Agent, or Firm*—Dowell & Dowell

[57] ABSTRACT

The present invention relates to a belt conveyor, wherein the belt comprises two lateral beads which grip around the traction and suspension cables. The assembly is tensioned between two drums. The beads engage in grooves in one drum and in corresponding grooves in the other. Thus, around these drums, the cable and the beads of the belt are compressed together to ensure excellent drive, but between the drums the beads are free to rotate on the cables.

6 Claims, 11 Drawing Figures

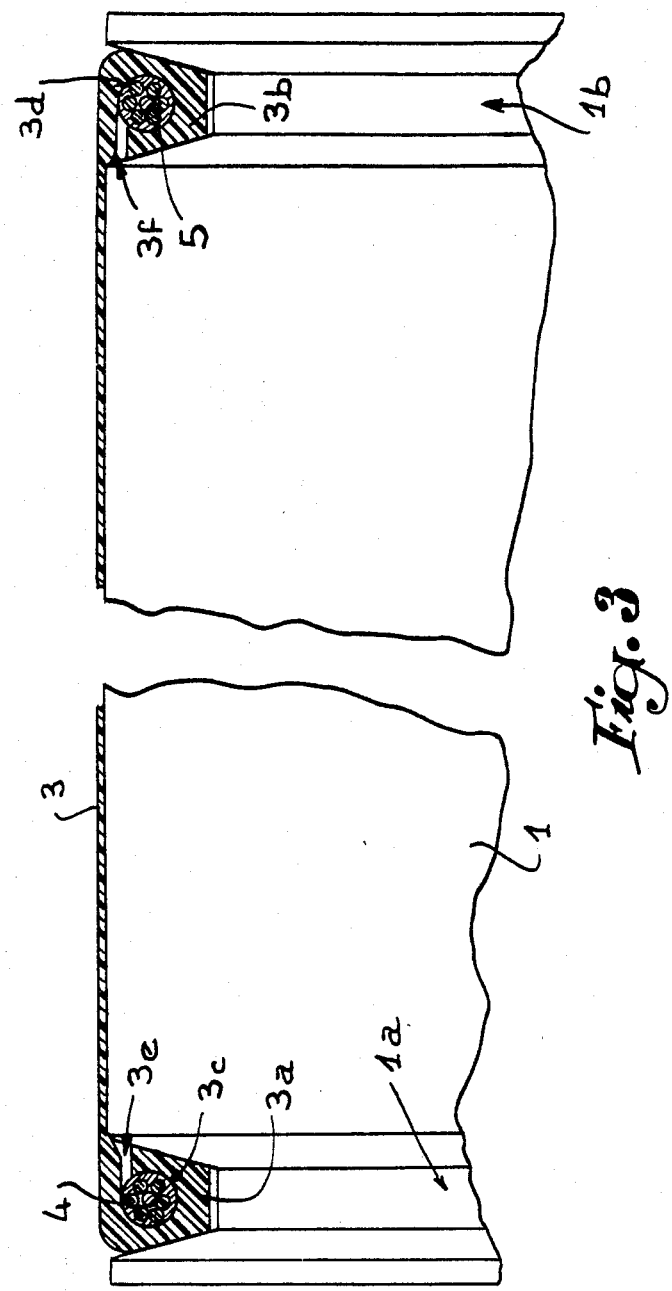

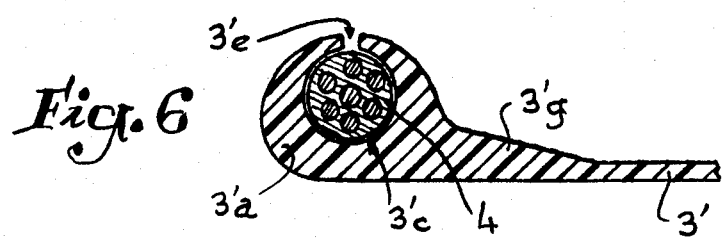
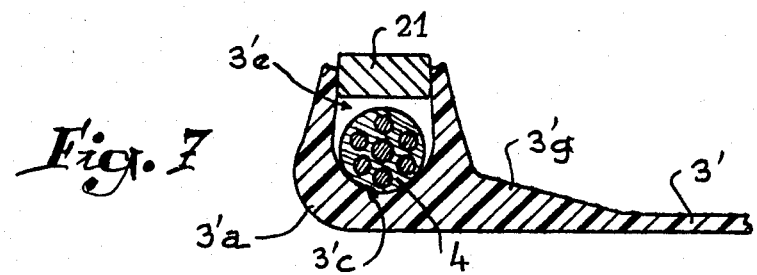
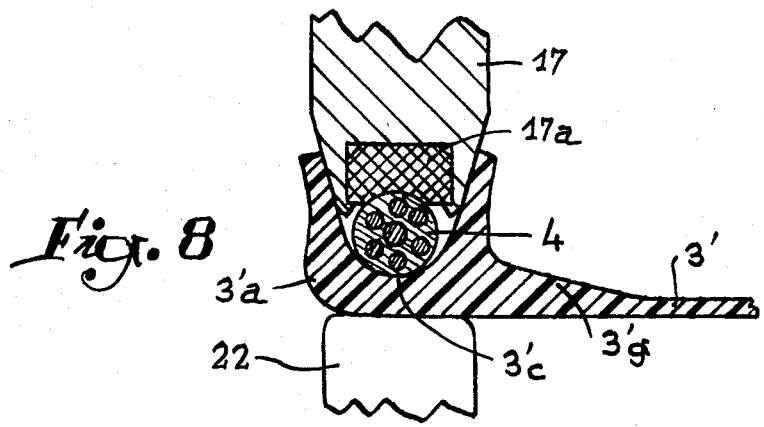
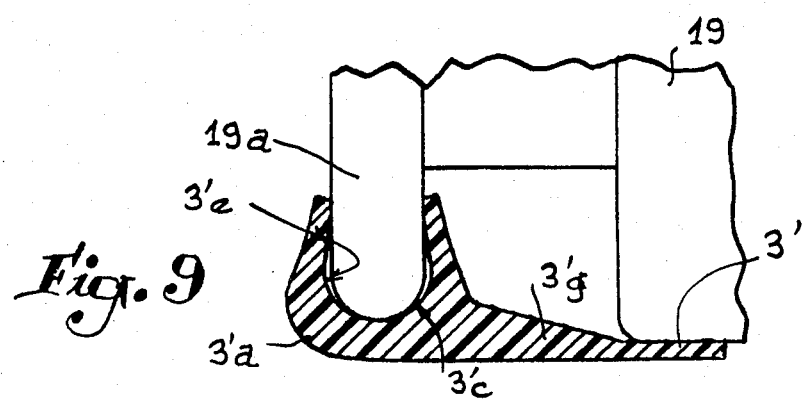

BELT CONVEYOR

The present invention relates to belt conveyors and enables various products to be continuously conveyed, whatever the distance, rate of flow, profile of the installation, and the density and nature of the materials.

In known systems of this type, the conveyor belts are constituted by reinforced endless belts, of different lengths and resting on transverse rollers. The latter are distributed over the whole length and depending on the load, both in the "zone of transport" and in the belt return part where their spaced apart relationship is different. Their ends generally comprise, on the one hand, a "drive" drum and, on the other hand, a guide drum, with a plurality of possible tensioning devices.

The apparatus thus designed require considerable infrastructures to support the rollers, this leading to a high cost of the installations.

Furthermore, if they pass over uneven ground and over considerable distances, it is imperative to adapt supports to the profile of this land. This results in very complex implantation and production of the fixed elements.

In another embodiment illustrated in U.S. Pat. Nos. 1,530,707 and 2,925,903, the conveyor belt is supported by cables and fastening elements are provided which join the belt and the cables at intervals.

According to another embodiment, disclosed in U.S. Pat. No. 3,326,354, the edges of the belt are directly moulded on the cables. Of course, such an arrangement can only be made for short belts. The cables are known to undergo torsional stresses which cause them to twist especially if the spans are long. This twisting is of course transmitted to the belt which is deformed and may lead to untimely unloading of the products conveyed. However, in any case, the belt is subjected to stresses which are detrimental to its life duration, despite the articulations existing between it and the fastening elements.

Finally, conveyor belts also exist, whose edges are suspended from hooks which roll in guide paths. This arrangement therefore requires expensive superstructures which suspension cable conveyors have eliminated.

It is an object of the improvements according to the present invention to overcome these drawbacks of known belt conveyors and to enable such a conveyor to be produced which can provide more rational possibilities of adaptation and improved operational versatility.

To this end, each of the two edges of the belt is constituted by a bore elastically cooperating with at least a part of the periphery of the corresponding funicular member.

The assembly thus constituted makes it possible to convey materials of low density at a relatively low speed over a relatively short distance, as will be more readily explained hereinbelow.

The invention will be more readily understood on reading the following description with reference to the accompanying drawings, in which:

FIGS. 2 to 4 are sections thereof on a larger scale, along II—II, III—III and IV—IV (FIG. 1).

FIGS. 6 to 11 are sections thereof along VI—VI, VII—VII, VIII—VIII, IX—IX, X—X and XI—XI (FIG. 5), respectively.

Figure 1:
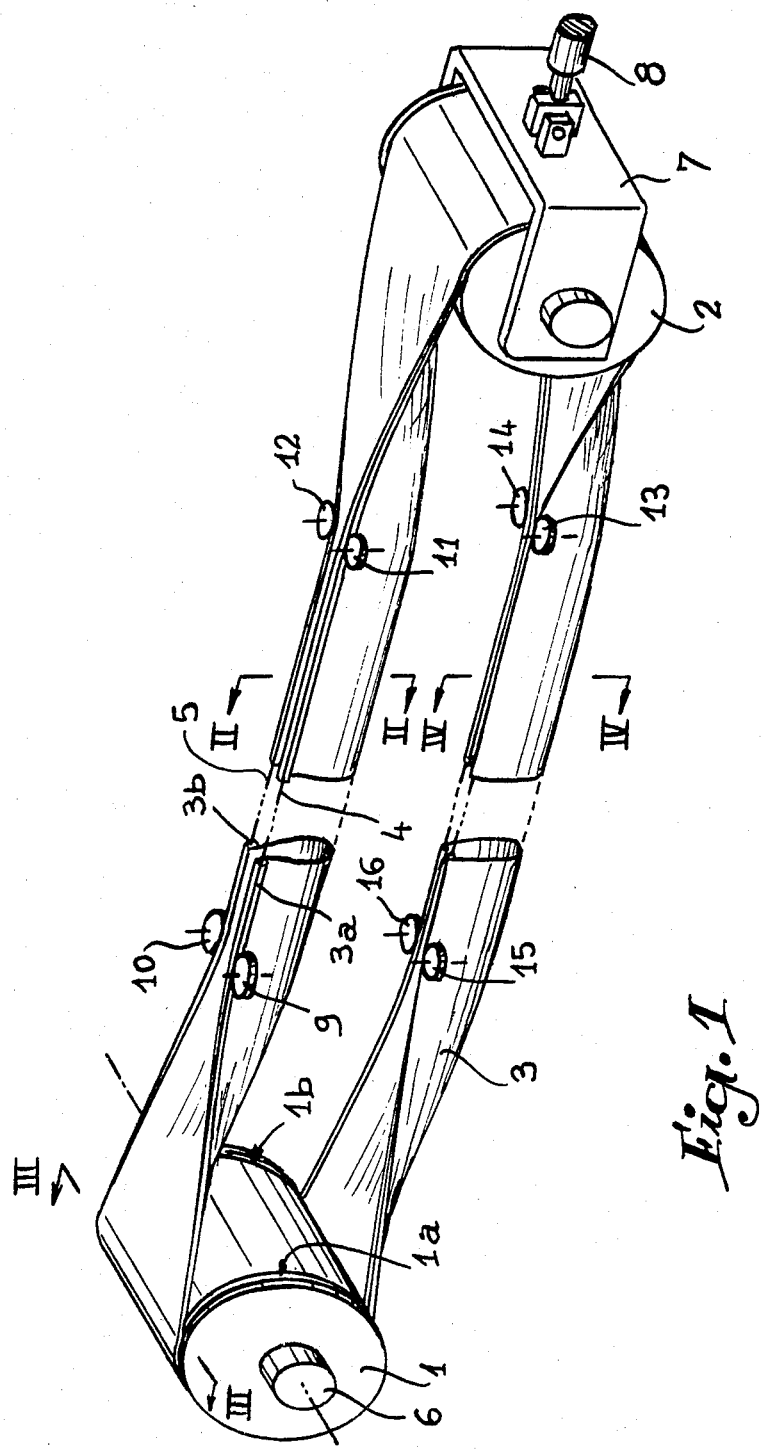
FIG. 1 is a schematic view in perspective of a belt conveyor according to the invention.

Referring now to the drawings, the belt conveyor illustrated in FIG. 1 essentially comprises two end drums 1, 2 of which the first is driven, and between which is carried a conveyor belt 3. The latter comprises hollow edges 3a, 3b in which a funicular member in the form of a cable 4, 5 passes. It will be noted that drum 1 is driven by an electric, hydraulic or like motor 6, whilst the drum 2 is associated with a stirrup element 7 subjected to the action of a member 8, such as a hydraulic jack, which ensures tensioning of the two sides of the belt 3.

Figure 2:
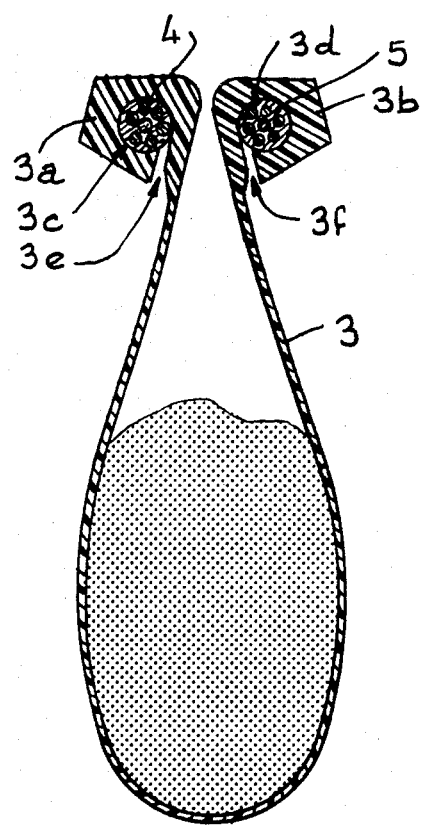

In manner known per se, the belt is loaded at drum 1, then is partially closed on itself, i.e. its edges 3a, 3b are brought close to each other so as to encompass the product conveyed, as illustrated in FIG. 2. To this end, rollers 9, 10 act on the respective edges 3a, 3b of the belt with a view to bringing them closer together, whilst other rollers 11, 12 maintain the belt closed until it resumes its flat form for unloading at drum 2.

Once the belt has passed around drum 2, rollers 13, 14 close the belt and others, 15, 16, maintain it closed up to a certain distance from drum 1 on which it rests flat, as illustrated in FIG. 3.

This Figure clearly shows the shape of the belt 3 of which each of the edges 3a, 3b is in the form of a trapezoidal bead comprising a central circular bore 3c, 3d in which the respective cable 4, 5 passes. A horizontal slot 3e, 3f extends parallel to the belt at the top of each bore, opening tangentially out at the junction of the conveyor belt and its two beads. In this way, each bead is generally in the form of a hook which grips around the corresponding cable without being integral therewith. In this way, and as explained hereinabove, if the cable twists for one reason or another, this twist does not communicate a torsional strain to the corresponding bead.

The central part of belt 3 cooperates with the periphery of the two drums 1 and 2, whilst its beads 3a, 3b penetrate in trapezoidal grooves made in said drums, only grooves 1a, 1b of drum 1 having been shown in the drawing.

The width of the grooves of the two drums is arranged to grip around the beads so that they cooperate closely with the cables on the periphery of the two drums so that drive is ensured.

Due to the non-adherence of the beads with respect to the two suspension cables 4 and 5, the load deposited on the belt and the action of the rollers 9, 10 cause pivoting of said beads with respect to the cables so that the belt forms in its part remote from the drums an elongated bag illustrated in FIGS. 1 and 2.

Figure 4:
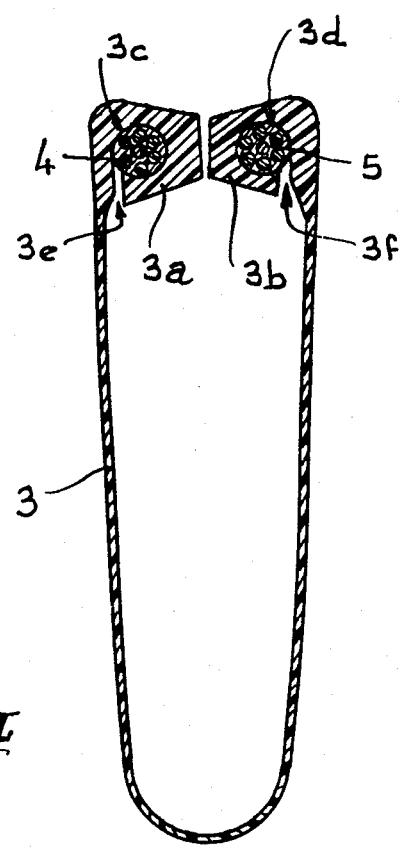

It will be readily understood that the return side of the belt is turned over in the direction opposite to that of the advance side, so that the face supporting materials to be conveyed is outside the bag formed on the return side as shown in FIG. 4. There gain, as each bead is not angularly fixed with respect to the corresponding cable, it may rotate with respect thereto to occupy the position illustrated in FIG. 4, in which the beads are disposed opposite the position which they occupy in FIG. 2.

Some drawbacks emerge from the fact that the cables and the beads of the belt are wound on the same drum. Said beads being sandwiched between the cables and the grooves of the drums, they undergo crushing stresses due to the tension of the cables and to the torque. In certain cases, these stresses are too high and the beads may break if use is particularly severe.

Figure 5:
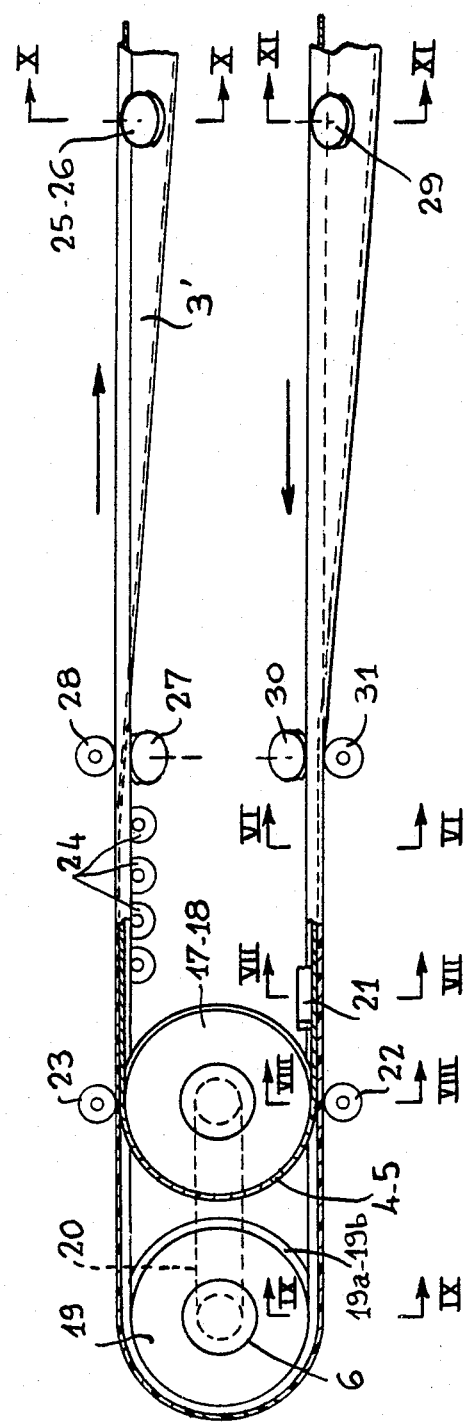
FIG. 5 illustrates one of the ends of a belt conveyor in accordance with the invention in a preferred embodiment.

In addition, if the distance between the drive drum 1 and the tensioning drum 2 is great, it is difficult for the original lengths of the loops of cable and those of the loops of the beads to be exactly equal. It is under these conditions that the following embodiment has been elaborated:

According to the embodiment illustrated in FIG. 5, the two cables 4 and 5 are tensioned over two special pulleys 17, 18, whilst the belt alone passes around a drum 19 located beyond the pulleys 17, 18 and which is driven simultaneously with these latter due to a transmission 20. It may be assumed for example that the drive motor 6 is associated with drum 19.

To make this separation of the cables and belt beads, the two cables 4 and 5 are disconnected from the central bores of the beads of belt 3.

As illustrated in FIG. 6, the modified belt 3' according to this embodiment comprises two beads 3'a, 3'b connected to the central part of the belt by a connection 3'g of decreasing section. It is observed that the slot 3'e of bead 3'a is located above the latter, i.e. it is directly turned upwardly in the return side and downwardly in the advance side.

Disconnection of cables 4 and 5 with respect to beads 3'a, 3'b of belt 3' is effected with the aid of a wedge 21 (FIG. 7) placed, immediately in front of the pulleys 17, 18 in the return side, and which separates the lips of slots 3'e, 3'f so that they straddle the lateral conical cheeks of the corresponding pulleys 17, 18 (FIG. 8). Of course, a presser roller 22 (FIGS. 5 and 8) maintains each of the beads in abutment against the cables at their point of contact with the pulleys 17, 18. The cables are therefore wound on pulleys with conventional packing 17a, 18a which may absorb the usual stresses of the cable conveyors without limitation of tension and of power.

As for belt 3', isolated from the cables, it winds round the drum 19 (FIG. 9) comprising two peripheral ribs 19a, 19b which penetrate in the bores of the beads to maintain the lips of their slots in spaced apart relationship (FIG. 9). Once the belt has passed around drum 19, these lips close on the cable tangentially to the pulleys 17, 18. To this end, a presser roller 23 (FIG. 5) maintains the bottom of the bore of each bead against the corresponding cable. The belt then passes over support rollers 24 disposed in the loading zone.

Figure 10:
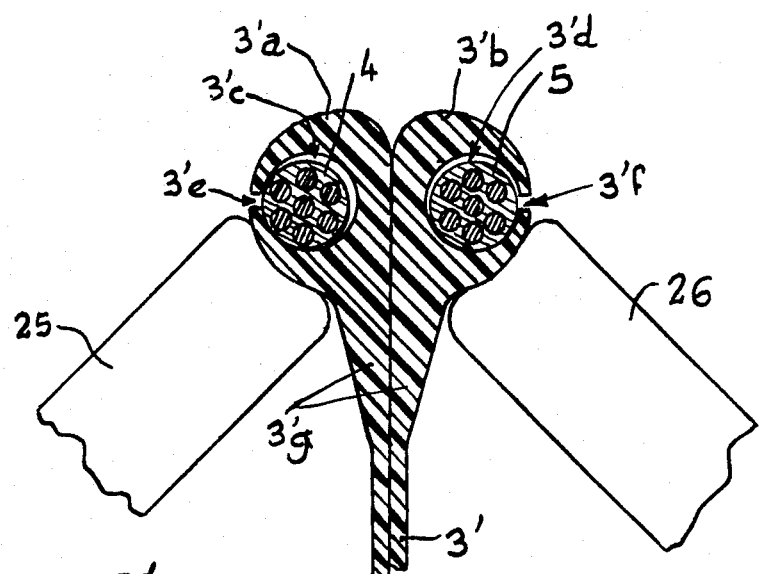
Figure 11:
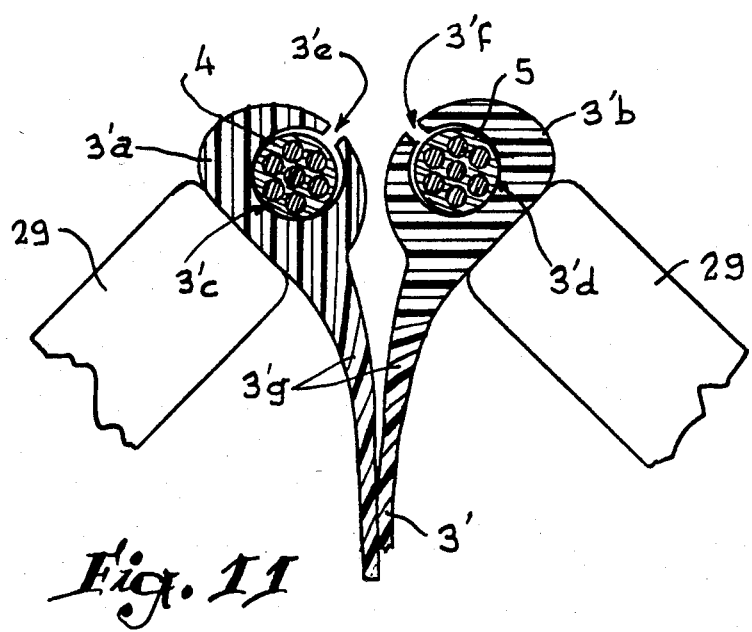

After this zone, the two beads of the belt are brought close to each other by means of rollers 25 (FIG. 10) which cause the two beads to pivot with respect to cables 4 and 5 so that the belt then constitutes a sort of vertical bag. It is observed that a whole series of rollers 26 may be placed between the loading zone in which the rollers 24 are located, and the spot where the two beads are joined, as illustrated in FIG. 10. Reference 27 denotes one of these rollers which cooperates with a counter-roller 28. Of course, the same applies on the return side of the belt where the presence is observed of rollers 29 for maintaining the two beads of belt 3' against each other and the presence of other rollers 30 with counter-rollers 31 adapted to guide the flattening of the belt.

At the other end of the conveyor, the same devices are obviously found, i.e. two pulleys for tensioning the cables, a drum for winding the belt and rollers for spacing apart the belt and for maintaining the beads against each other.

Due to this arrangement, the distance between axes of the cable tensioning pulleys may be adjusted, independently of those of the rollers so as to have a tolerance on the original lengths of said cables different from those of the belt.

What is claimed is:

1. A belt conveyor, comprising:
   (a) an endless belt having a central portion and having two transversely spaced sides;
   (b) plural belt supporting drums mutually spaced longitudinally of the belt, the belt lying in an open substantially flat profile where it enters and leaves the drums;
   (c) two funicular members spaced transversely of the belt adjacent to its respective sides;
   (d) roller means located between the longitudinally spaced drums and engaging the sides of the belt and bringing them close to each other, whereby to rotate the sides of the belt from said flat profile to a substantially vertical orientation, wherein the central portion of the belt assumes a substantially closed-loop elongated bag profile; and
   (e) each side of the belt having a thickened bead having a longitudinal bore extending therewithin to receive a funicular member and each bead having a slot extending outwardly through the bead from the bore through which to pass a funicular member, the bead being free to rotate about the funicular member as the belt is deflected between its flat profile and its closed-loop profile without communicating torsional strain between the bead and the funicular member.

2. A belt conveyor as claimed in claim 1, wherein said longitudinally spaced drums have V-grooves extending around their peripheries adjacent the respective beads, and wherein each bead comprises a trapezoidal portion shaped to enter a pulley V-groove, each bore being located within the associated trapezoidal portion, and each slot extending from a bore through the bead parallel to the adjacent side of the belt.

3. A belt conveyor as claimed in claim 2, wherein said funicular members are cables and wherein said bores are circular in cross-section, and each slot entering a bore substantially tangent to the portion of the bore which is located nearest the junction of the bead and the belt.

4. A belt conveyor as claimed in claim 1, wherein the conveyor further comprises near each end of the belt a pair of transversely spaced pulleys shaped and located to receive the respective funicular members, the pulleys being located toward the opposite end of the belt from the associated drum; and wherein the slot in each bead extends from its bore toward the pulleys and drums perpendicularly to the adjacent side of the belt, whereby as a belt approaches a drum and its associated pulleys the funicular members are separated from the bores through the slots and pass around the pulleys while the belt passes around the associated drum and whereby the funicular members are reinserted into the bores as the belt leaves the pulleys.

5. A belt conveyor as claimed in claim 4, wherein the pulleys each comprise two outer cheeks which enter into the slot of a bead and open it to permit the funicular member to separate from the belt and follow the pulley, and wherein the drums each have two transversely spaced peripheral ribs extending therearound adjacent to the beads of the belt, said ribs entering the bores of the beads through the slots and guiding the belt while it passes around the drum.

6. A belt conveyor as claimed in claim 5, further comprising means for driving the pulleys; and the belt conveyor further including a presser roller abutting the bead opposite the cheeks of each pulley to maintain the bead against the pulley as the cheeks spread the slot to free the funicular members to engage the pulley.

* * * * *